(12) United States Patent
Park

(10) Patent No.: US 12,296,826 B2
(45) Date of Patent: May 13, 2025

(54) BRAKING CONTROL FOR PLATOON DRIVING CONTROL SYSTEM AND METHOD OF VEHICLE

(71) Applicant: HYUNDAI MOBIS CO., LTD., Seoul (KR)

(72) Inventor: Seung Jin Park, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 74 days.

(21) Appl. No.: 17/332,595

(22) Filed: May 27, 2021

(65) Prior Publication Data
US 2021/0370937 A1 Dec. 2, 2021

(30) Foreign Application Priority Data
Jun. 2, 2020 (KR) .................. 10-2020-0066727

(51) Int. Cl.
*B60T 7/12* (2006.01)
*B60T 7/22* (2006.01)
(Continued)

(52) U.S. Cl.
CPC .......... *B60W 30/165* (2013.01); *B60W 10/18* (2013.01); *B60W 30/09* (2013.01);
(Continued)

(58) Field of Classification Search
CPC ........... B60W 30/165; B60W 60/0015; B60W 2556/65; B60W 2552/15; B60W 10/18;
(Continued)

(56) References Cited

U.S. PATENT DOCUMENTS

2014/0067211 A1* 3/2014 Kim .................. B60W 30/143
701/54
2016/0236685 A1* 8/2016 Inoue ................. B60W 30/165
(Continued)

FOREIGN PATENT DOCUMENTS

CN 107406077 A 11/2017
CN 107428316 A 12/2017
(Continued)

OTHER PUBLICATIONS

Principles of Physics—Radi et. al, pp. 22, 52 and 53 (Year: 2013).*
(Continued)

*Primary Examiner* — Jess Whittington
*Assistant Examiner* — Rami Nabih Bedewi
(74) *Attorney, Agent, or Firm* — MORGAN, LEWIS & BOCKIUS LLP

(57) ABSTRACT

A platoon driving control system of a vehicle includes a detector configured to detect an obstacle positioned in a front according to a driving direction of a vehicle included in a platoon; a processor; and a memory coupled to the processor and storing an algorithm that, when executed by the processor, causes the processor to: determine a braking strategy of the vehicle included in the platoon based on a driving speed of the platoon, and control a driving of the platoon based on the obstacle detected by the detector and the braking strategy.

8 Claims, 7 Drawing Sheets

(51) Int. Cl.
  *B60W 10/18*    (2012.01)
  *B60W 30/09*    (2012.01)
  *B60W 30/16*    (2020.01)
  *B60W 30/165*   (2020.01)
  *B60W 40/076*   (2012.01)
  *B60W 40/105*   (2012.01)
  *B60W 60/00*    (2020.01)
  *G06V 20/58*    (2022.01)
  *G08G 1/00*     (2006.01)

(52) U.S. Cl.
  CPC ........ *B60W 30/162* (2013.01); *B60W 40/076* (2013.01); *B60W 40/105* (2013.01); *B60W 60/0015* (2020.02); *G06V 20/58* (2022.01); *G08G 1/22* (2013.01); *B60W 2552/15* (2020.02); *B60W 2556/65* (2020.02)

(58) Field of Classification Search
  CPC .. B60W 30/09; B60W 30/162; B60W 40/076; B60W 40/105; G06V 20/58; G08G 1/22
  See application file for complete search history.

(56) References Cited

U.S. PATENT DOCUMENTS

| | | | | |
|---|---|---|---|---|
| 2018/0137763 A1* | 5/2018 | Deragården | ......... | G05D 1/0295 |
| 2019/0041861 A1* | 2/2019 | Kim | ............ | G05D 1/0248 |
| 2019/0079528 A1* | 3/2019 | Zhu | ............ | G05D 1/0238 |
| 2019/0241185 A1* | 8/2019 | Kuszmaul | ........... | B60W 30/165 |
| 2019/0384322 A1* | 12/2019 | Luckevich | ........... | G05D 1/0285 |
| 2021/0001850 A1* | 1/2021 | Shamshiri | ............. | B60W 30/16 |
| 2021/0074165 A1* | 3/2021 | Pfadler | ............... | B60W 30/165 |
| 2022/0289222 A1* | 9/2022 | David | .................. | B60W 50/14 |
| 2022/0343760 A1* | 10/2022 | Baek | ...................... | H04W 4/46 |
| 2022/0383753 A1* | 12/2022 | Kim | ....................... | G08G 1/166 |

FOREIGN PATENT DOCUMENTS

| | | |
|---|---|---|
| CN | 109291872 A | 2/2019 |
| CN | 109690642 A | 4/2019 |
| CN | 109895773 A | 6/2019 |
| CN | 109910874 A | 6/2019 |
| JP | 2015-134584 A | 7/2015 |
| KR | 10-2016-0033513 A | 3/2016 |
| KR | 10-2017-0034696 A | 3/2017 |
| SE | 1550721 A1 | 1/2017 |

OTHER PUBLICATIONS

Office Action issued on Jun. 30, 2023 for corresponding Chinese Patent Application No. 202110614696.7 (See English Translation).
Office Action issued in corresponding Chinese patent application No. 202110614696.7 on Mar. 23, 2024, with English translation.

* cited by examiner

BRAKING CONTROL FOR PLATOON DRIVING CONTROL SYSTEM AND METHOD OF VEHICLE

CROSS REFERENCE TO RELATED APPLICATION

The present application claims priority to Korean Patent Application No. 10-2020-0066727, filed Jun. 2, 2020, the entire contents of which is incorporated herein for all purposes by this reference.

BACKGROUND

Technical Field

The present disclosure relates to a platoon driving control system of a vehicle and method thereof, and more particularly, to an emergency braking control of vehicles autonomously performing platoon driving.

Description of the Related Art

The development of the technology incorporating various sensors and electronic devices into vehicles is accelerating in order to increase the safety and convenience of users who use vehicles. In particular, a system that provides various functions (e.g., smart cruise control, lane keeping assistance) developed for the user's driving convenience has been mounted on a vehicle. Accordingly, so-called autonomous driving, in which a vehicle travels on a road in consideration of an external environment by itself without driver's manipulation, has been developing step by step.

Platoon driving, which is included as one of autonomous driving, means that a plurality of vehicles grouped into a group travels autonomously in consideration of the external environment, respectively, and travels on the road while sharing driving information with each other.

In particular, a leader vehicle and a follower vehicle are included in one platoon. The leader vehicle is a vehicle that leads the platoon at the forefront of the platoon, and the follower vehicle is a vehicle that follows the leader vehicle.

Platoon driving is mainly achieved by performing distance control between the leader vehicle at the head of the lane and a number of vehicles following the guidance of the leader vehicle while communicating with each other. In general, each vehicle in a platoon is equipped with a plurality of sensors to enable individual autonomous driving.

However, in a conventional platoon driving, there is no specific application of the technology for FCA (Forward Collision Avoidance) and AEB (Autonomous Emergency Brake) control in which a detection sensor is used to recognize a preceding vehicle, warn the driver when a collision with the preceding vehicle is expected, and automatically activate a brake to avoid a collision or reduce damage.

In addition, there is a problem in that the forward collision avoidance system according to the conventional technology is tuned on a flat road and does not take into account a phenomenon in which braking performance is changed on an inclined road.

The matters described as background art are only for improving understanding of the background of the present disclosure, and should not be taken as acknowledging that they correspond to the prior art already known to those of ordinary skill in the art.

SUMMARY

The present disclosure has been proposed to solve this problem, and is to provide a technology for preventing a collision within a platoon by specifically applying a forward collision avoidance technology to platoon driving.

In order to achieve the purpose above, the platoon driving control system of a vehicle according to the present disclosure includes a detector configured to detect an obstacle positioned in a front according to a driving direction of a vehicle included in a platoon; a processor; and a memory coupled to the processor and storing an algorithm that, when executed by the processor, causes the processor to: determine a braking strategy of the vehicle included in the platoon based on a driving speed of the platoon, and control a driving of the platoon based on the obstacle detected by the detector and the braking strategy.

The memory may store the algorithm that, when executed by the processor, further causes the processor to determine, based on a target deceleration, a speed profile over time when the vehicle is braking as the braking strategy.

The memory may store the algorithm that, when executed by the processor, further causes the processor to determine the speed profile over time assuming that the obstacle is detected at a preset first speed or the speed profile over time when the vehicle included in the platoon brakes at a preset second speed as the braking strategy.

The memory may store the algorithm that, when executed by the processor, further causes the processor to determine the speed profile of a following vehicle over time based on the speed profile of a preceding vehicle included in the platoon over time.

The memory may store the algorithm that, when executed by the processor, further causes the processor to determine that the speed profile of the following vehicle over time is delayed by a preset time rather than the speed profile of the preceding vehicle over time.

The memory may store the algorithm that, when executed by the processor, further causes the processor to set a separation distance between the vehicles included in the platoon based on the determined braking strategy, and control the platoon driving based on the set separation distance.

The memory may store the algorithm that, when executed by the processor, further causes the processor to set the separation distance between a preceding vehicle and a following vehicle based on a speed profile of the vehicle over time when the preceding vehicle and the following vehicle included in the platoon are braking.

The memory may store the algorithm that, when executed by the processor, further causes the processor to estimate a slope of a road on which the platoon or the vehicle included in the platoon is driving may be further included, and to determine the braking strategy of the vehicle included in the platoon based on the estimated slope.

The memory may store the algorithm that, when executed by the processor, further causes the processor to calculate a compensation deceleration by reflecting a deceleration according to the estimated slope to a target deceleration, and to determine, based on the calculated compensation deceleration, a speed profile over time when the vehicle included in the platoon is braked as the braking strategy.

The memory may store the algorithm that, when executed by the processor, further causes the processor to control a braking device of the vehicle included in the platoon according to the braking strategy determined during braking.

In order to achieve the purpose above, the method for controlling platoon driving of a vehicle according to the present disclosure includes the steps of: determining a braking strategy of a vehicle included in a platoon based on a driving speed of the platoon; detecting an obstacle positioned in a front according to a driving direction of the vehicle included in the platoon; and controlling platoon driving based on the determined braking strategy and the detected obstacle.

In the step of determining a braking strategy of a vehicle, a speed profile over time during braking of the vehicle may be determined as the braking strategy based on a target deceleration.

In the step of determining the braking strategy of the vehicle, a speed profile over time assuming that the obstacle is detected at a preset first speed or a speed profile over time when the vehicle brakes at a preset second speed can be determined as the braking strategy.

In the step of determining the braking strategy of the vehicle, a speed profile of a following vehicle over time may be determined based on a speed profile of a preceding vehicle included in the platoon over time.

In the step of determining the braking strategy of the vehicle, a speed profile of a following vehicle over time may be determined to be delayed by a preset time, rather than a speed profile of a preceding vehicle over time.

The method may further include, prior to the step of controlling the platoon driving, a step of setting a separation distance between the vehicles included in the platoon based on the determined braking strategy is further included. In the step of controlling the platoon driving, the platoon driving can be controlled based on the set separation distance.

In the step of setting the separation distance, the separation distance between a preceding vehicle and a following vehicle may be set based on a speed profile of the vehicle over time when the preceding vehicle and the following vehicle included in the platoon are braking.

The method may further include, prior to the step of determining the braking strategy of the vehicle, a step of estimating a slope of a road on which the platoon or the vehicle included in the platoon is driving is further included. In the step of determining the braking strategy of the vehicle, the braking strategy of the vehicle included in the platoon can be determined based on the estimated slope.

In the step for determining the braking strategy of the vehicle, a compensation deceleration is calculated by reflecting a deceleration according to the estimated slope to a target deceleration, and when the vehicle included in the platoon is braked, the speed profile overtime can be determined as the braking strategy based on the calculated compensation deceleration.

In the step of controlling the platoon driving, a braking device of the vehicle included in the platoon may be controlled according to the braking strategy determined during braking.

In the platoon driving control system of a vehicle and method thereof according to the present disclosure, a collision between a vehicle included in a platoon and an obstacle or a collision between vehicles included in the platoon is prevented.

In addition, by detecting an obstacle in a stationary state, it has the effect of securing the reliability of braking vehicles included in the platoon even if the relative speed with the obstacle is large,

DETAILED DESCRIPTION

Figure 1:
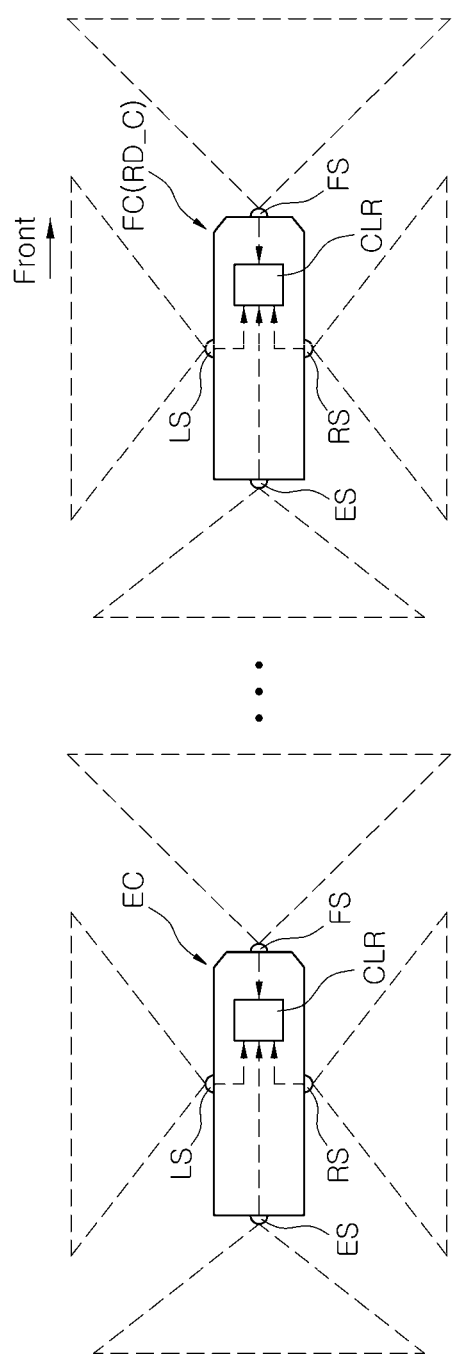
FIG. 1 is a diagram illustrating platooning vehicles to which a platoon driving control system of a vehicle according to an embodiment of the present disclosure can be applied.

Specific structural or functional descriptions of the embodiments of the present disclosure disclosed in this specification or application are exemplified only for the purpose of describing the embodiments according to the present disclosure, and the embodiments according to the present disclosure may be implemented in various forms, and should not be construed as being limited to the embodiments described in this specification or application.

Since the embodiments according to the present disclosure can be modified in various ways and have various forms, specific embodiments are illustrated in the drawings and will be described in detail in the present specification or application. However, this is not intended to limit the embodiments according to the concept of the present disclosure to a specific form of disclosure, and it should be understood that all changes, equivalents, and substitutes included in the spirit and scope of the present disclosure are included.

Terms such as first and/or second may be used to describe various components, but the components should not be limited by the terms. The above terms are only for the purpose of distinguishing one component from other components, for example, without departing from the scope of the rights according to the concept of the present disclosure, the first component may be referred to as the second component, and similarly the second component may also be referred to as a first component.

When a component is referred to as being "connected" or "contacted" to another component, it should be understood that it may be directly connected or contacted to the other component, but other components may exist in the middle. On the other hand, when a component is referred to as being "directly connected" or "directly contacted" to another component, it should be understood that there is no other component in the middle. Other expressions describing the relationship between components, such as "between" and "just between" or "adjacent to" and "directly adjacent to" should be interpreted as well.

The terms used in the present specification are only used to describe specific embodiments, and are not intended to limit the present disclosure. Singular expressions include plural expressions unless the context clearly indicates otherwise. In the present specification, terms such as "comprise" or "have" are intended to designate the presence of a set feature, number, step, action, component, part, or combination thereof, but it should be understood that the presence or additional possibilities of one or more other features, numbers, steps, actions, components, parts, or combinations thereof are not preliminarily excluded.

Unless otherwise defined, all terms used herein, including technical or scientific terms, have the same meaning as commonly understood by one of ordinary skill in the art to which the present disclosure belongs. Terms such as those defined in a commonly used dictionary should be interpreted as having a meaning consistent with the meaning of the related technology, and should not be interpreted as an ideal or excessively formal meaning unless explicitly defined in the present specification.

Hereinafter, the present disclosure will be described in detail by describing a preferred embodiment of the present disclosure with reference to the accompanying drawings. The same reference numerals shown in each drawing indicate the same members.

Figure 2:
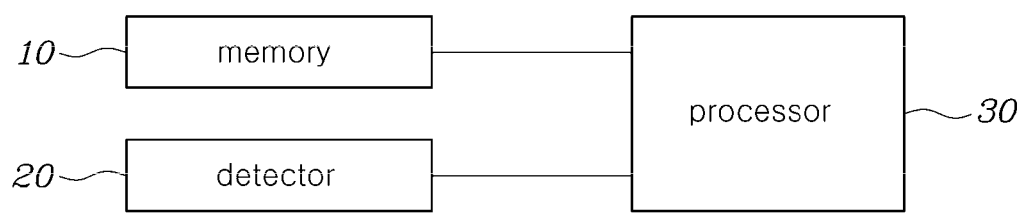
FIG. 2 is a block diagram of a platoon driving control system of a vehicle according to an embodiment of the present disclosure.

FIG. 1 is a diagram illustrating platooning vehicles to which a platoon control system of a vehicle according to an embodiment of the present disclosure can be applied, and FIG. 2 is a block diagram of a platoon driving control system of a vehicle according to an embodiment of the present disclosure.

Referring to FIGS. 1 to 2, a number of vehicles from the frontmost vehicle (FC) to the rearmost vehicle (EC) run in a row in sequence. Each vehicle is equipped with a number of sensors, and a controller (CLR) that recognizes various obstacles around the vehicle and controls the vehicle based on the signals of these sensors. The controllers (CLRs) of each of these vehicles share necessary data through mutual communication and transfer commands according to a predetermined command system, so that the moving to the destination by continuous platooning can be occurred.

For reference, in FIG. 1, the sensors of each vehicle are indicated as having a front sensor (FS), a left sensor (LS), a right sensor (RS), and a rear sensor (ES), but in actual vehicles, there are more sensors or various changes are possible, such as being provided or partially omitted.

In addition, the foremost vehicle FC is a leader vehicle (RD_C), and serves to lead the following vehicles at the forefront of the group of vehicles performing platooning.

A platoon driving control system of a vehicle according to an embodiment of the present disclosure includes: a processor 30 that determines a braking strategy of a vehicle included in a platoon based on a driving speed of the platoon; a detector 20 that detects an obstacle positioned in a front according to a driving direction of the vehicle included in the platoon; and a processor 30 that controls a driving of the platoon based on the obstacle detected by the detector 20 and the braking strategy determined by the processor 30.

The processor 30 according to an exemplary embodiment of the present disclosure may be implemented by an algorithm configured to control the operation of various components of the vehicle, and a nonvolatile memory 10 configured to store data related to software instruction reproducing the algorithm. The processor 30 may be configured to perform the operation described below using the data stored in the memory 10. Here, the memory 10 and the processor 30 may be implemented as separate chips. Alternatively, the memory 10 and processor 30 may be implemented as a single chip integrated with each other. The processor 30 may take the form of one or more processors.

The detector 20 and the processor 30 according to one embodiment may be included in the electronic control unit (ECU) of the vehicle (in particular, a leader vehicle) included in a platoon, or in a separate controller that controls autonomous driving of the vehicle.

In another embodiment, the detector 20 and the processor 30 may be included in a separate control device that controls platoon driving.

The processor 30 may determine a braking strategy of the vehicle included in a platoon based on the driving speed of the vehicle included in the platoon. Here, the braking strategy may be a braking strategy of vehicles included in the platoon to prevent a collision with the detected obstacle when the detector 20 detects the obstacle in front of the platoon.

The detector 20 may be a detection sensor that detects a relative position and a relative speed of an obstacle with respect to a vehicle.

In one embodiment, the detection sensor may be a camera sensor, a lidar sensor, a radar sensor, or an ultrasonic sensor. The detection sensor mounted on a vehicle can detect the relative position of an obstacle with respect to the vehicle.

In addition, the detection sensor may detect the speed of an obstacle or may detect the relative speed of the obstacle based on the speed of a vehicle.

The detector 20 can calculate a predicted collision time with an obstacle using the position of the detected obstacle and a vehicle speed when detecting the obstacle, and the processor 30 can determine the vehicle's braking strategy based on the calculated predicted collision time.

More specifically, the processor 30 may calculate a required deceleration based on the predicted collision time calculated by the detector 20 and determine the braking strategy of the vehicle.

Particularly, when the value obtained by integrating the relative speed between the obstacle and the vehicle over time is the distance between the obstacle and the vehicle, the distance between the obstacle and the vehicle becomes zero and a collision occurs.

In one embodiment, the detector 20 may detect the distance between an obstacle and a vehicle and the relative speed between the obstacle and the vehicle, and use this to calculate a predicted time to collision (TTC) as shown in the following equation.

$$TTC = t\_col - t\_cur = d/V\_cur \; [sec]$$

Here, d is the distance between the obstacle and the vehicle, and V_cur is the relative speed between the obstacle and the vehicle in a current state.

In another embodiment, the detector 20 may predict a relative speed until a collision using the current relative speed between an obstacle and a vehicle, and calculate the time (TTC) at which a value obtained by integrating the relative speed from the predicted current time to the time of the collision over time becomes the distance (d) between the obstacle and the vehicle.

To avoid a collision, the vehicle must set the relative speed to the obstacle to zero before the predicted time to collision (TTC). The braking strategy can be determined so that the value obtained by integrating the vehicle's deceleration over time before the predicted time to collision (TTC) becomes the relative speed between the obstacle and the vehicle.

In one embodiment, a required deceleration (a_req) may be calculated as a profile in which the value integrated over time set less than or equal to a predicted time to collision becomes a relative speed between an obstacle and a vehicle.

The profile of the required deceleration (a_req) may be calculated so that a deceleration is maintained at a constant size, the size increases with time, or the size decreases with time.

The processor 30 may control the driving of a platoon based on the driving route set by a navigation, the obstacle detected by the detector 20, and the braking strategy determined by the processor 30.

Specifically, the processor 30 may control the autonomous driving of the platoon by controlling various sensors, driving devices, and steering devices of vehicles included in the platoon, or by controlling the driving of the leader vehicle or the trailing vehicle included in the platoon.

Figure 3:
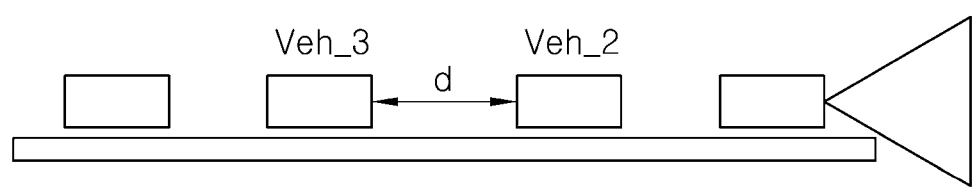
FIG. 3 illustrates a platoon driving according to an embodiment of the present disclosure.
Figure 4A:
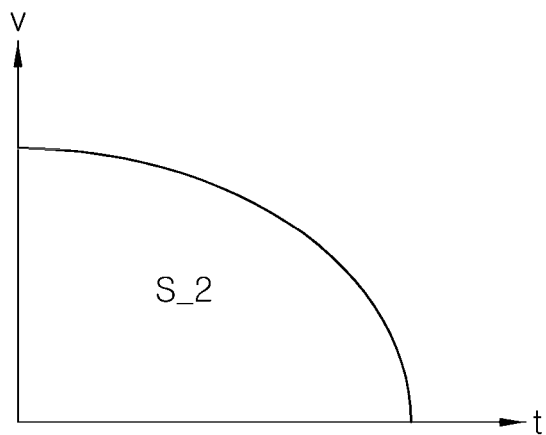
FIG. 4A-FIG. 4C are diagrams illustrating a speed profile and a deceleration profile of a vehicle included in a platoon according to an embodiment of the present disclosure.
Figure 4B:
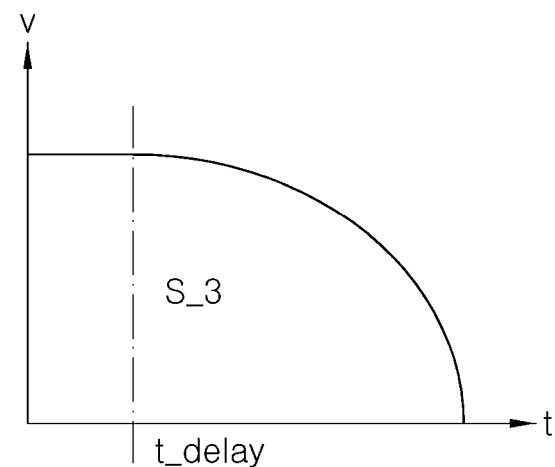
Figure 4C:
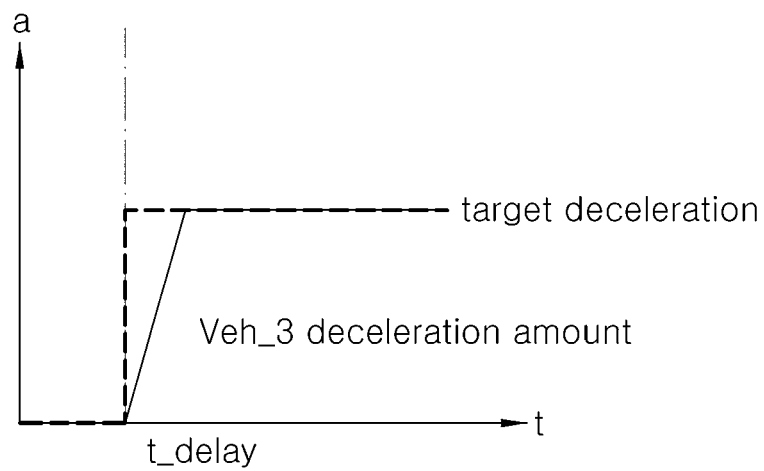

FIG. 3 is a diagram illustrating platoon driving according to an embodiment of the present disclosure, and FIG. 4A-FIG. 4C are diagrams illustrating a speed profile and a deceleration profile of a vehicle included in the platoon according to an embodiment of the present disclosure.

With further reference to FIGS. 3 to 4, the processor 30 may determine a speed profile over time during braking of a vehicle based on a target deceleration as a braking strategy.

Specifically, the processor 30 may determine the speed profile of the vehicle included in the platoon set based on a preset target deceleration as the braking strategy.

In another embodiment, the processor 30 may set a target deceleration in consideration of the distance from a preceding vehicle or the speed of a vehicle, and determine the speed profile of the vehicle included in a platoon according to the target deceleration as a braking strategy.

In particular, the deceleration profile may be preset to increase with time from a braking point to follow a preset target deceleration.

In one embodiment, the processor 30 may determine as a braking strategy a speed profile over time assuming that an obstacle is detected at a preset first speed, or a speed profile over time when the vehicle included in the platoon brakes at a preset second speed.

When an obstacle is in a stationary state, the preset first speed of the obstacle may be set to 0. In addition, the present second speed of the vehicle included in the platoon may be set to 0 so as to brake until the vehicles included in the platoon stop.

Accordingly, by detecting an obstacle in a stationary state, it has the effect of securing the reliability of braking vehicles included in the platoon even if the relative speed with the obstacle is large.

The processor 30 may determine a speed profile over time of a following vehicle based on a speed profile over time of a preceding vehicle included in the platoon.

In one embodiment, the processor 30 may determine a speed profile so that a following vehicle does not collide with a preceding vehicle based on the speed profile of the preceding vehicle over time and the distance between the preceding vehicle and the following vehicle.

In particular, the processor 30 may determine the speed profile according to the time of the following vehicle such that it is delayed by a preset time (t_delay) rather than the speed profile according to the time of the preceding vehicle.

In one embodiment, the delay time (t_delay) of the braking timing may be preset to a constant value, or may be set based on a separation distance between a preceding vehicle and a following vehicle and a vehicle speed.

Accordingly, it has the effect of avoiding a collision between vehicles inside the platoon during emergency braking.

The processor 30 may set a separation distance between vehicles included in a platoon based on a determined braking strategy, and control the driving of the platoon based on the set separation distance.

In particular, the processor 30 controls the driving of the vehicle included in the platoon, but may control the preceding vehicle and the following vehicle included in the platoon to travel in a state that is spaced apart by the set separation distance.

Specifically, the processor 30 may set a separation distance between the preceding vehicle and the following vehicle based on the speed profile of the vehicle over time when the preceding vehicle and the following vehicle included in the platoon are braking.

In one embodiment, the processor 30 may set a separation distance to avoid a vehicle collision during braking according to the speed profile of the vehicle over time during braking.

FIG. 4A is a speed profile over time during emergency braking of a preceding vehicle (Veh_2). S_2 is a value obtained by integrating the speed profile over time, and may be a stopping distance of the preceding vehicle (Veh_2).

FIG. 4B is a speed profile over time during emergency braking of a following vehicle (Veh_3). S_3 is a value obtained by integrating the speed profile over time, and may be a stopping distance of the following vehicle (Veh_3).

The processor can set the separation distance (d) between the preceding vehicle (Veh_2) and the following vehicle (Veh_3) as a following equation in consideration of the stopping distance (S_2) of the preceding vehicle (Veh_2) and the stopping distance (S_3) of the following vehicle (Veh3).

$$d \geq S\_3 - S\_2 + \alpha$$

where α is a tuning parameter.

In another embodiment, in the processor 30, the speed profile may set the separation distance (d) such that the target deceleration rate is less than a preset size when the vehicle included in the platoon is braked.

Figure 5:
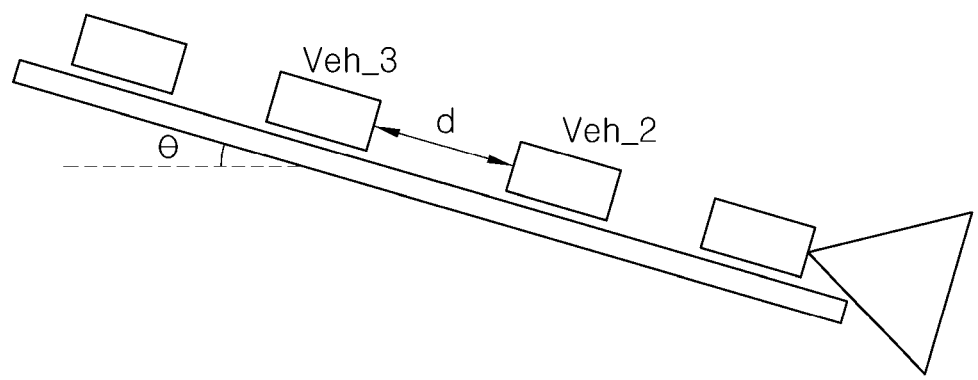
FIG. 5 illustrates a platoon driving according to an embodiment of the present disclosure.
Figure 6A:
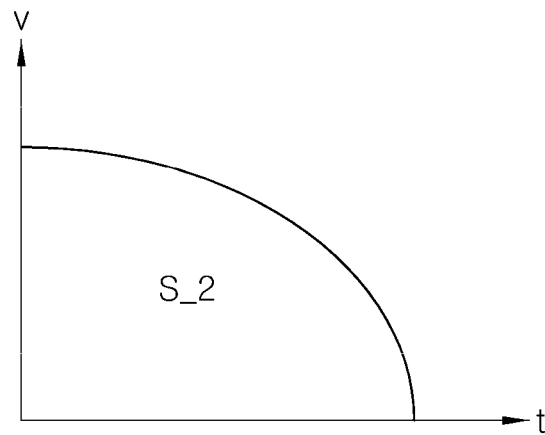
FIG. 6A-FIG. 6C are diagrams illustrating a speed profile and a deceleration profile of a vehicle included in a platoon according to an embodiment of the present disclosure.
Figure 6B:
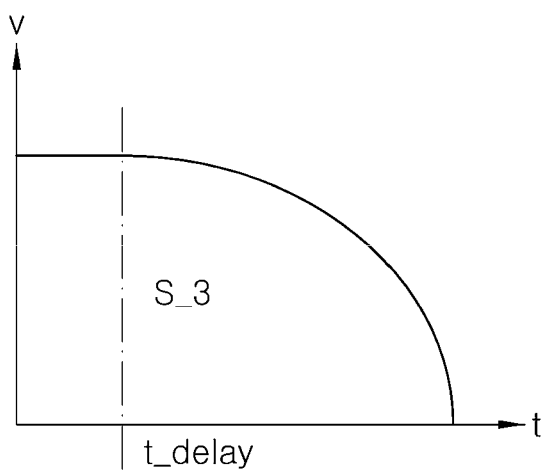
Figure 6C:
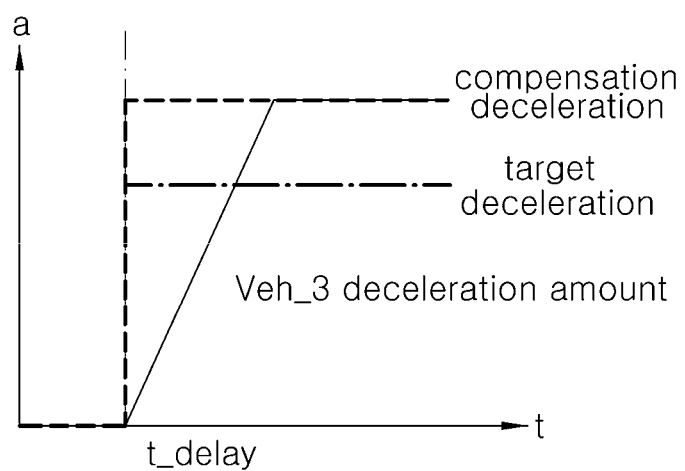

FIG. 5 is a diagram illustrating platoon driving according to an embodiment of the present disclosure, and FIG. 6A-FIG. 6C are diagrams illustrating a speed profile and a deceleration profile of a vehicle included in the platoon according to an embodiment of the present disclosure.

With further reference to FIGS. 5 to 6C, a processor 30 that estimates the slope of a road on which platoon or the vehicles included in the platoon is traveling may be further included. In the processor 30, the braking strategy of the vehicles included in the platoon can be determined based on the estimated slope.

In one embodiment, the processor 30 may estimate a slope of a road by sensing a rotation angle at which a vehicle is rotated in a pitch direction.

The processor 30 may be connected to a posture sensor, a pitch sensor, or an acceleration sensor (G sensor) for sensing a rotation angle in the pitch direction of a vehicle, and may estimate the slope of a road on which the vehicle is traveling.

In another embodiment, the processor 30 may estimate a slope of a road based on navigation information or a sensed change in atmospheric pressure.

The processor 30 may estimate the slope of a road on which a vehicle is traveling by using navigation information that is input through a communication device or previously stored.

Alternatively, the processor 30 may be connected to an atmospheric pressure sensor mounted on a vehicle, and may estimate the slope of the road based on the change in atmospheric pressure sensed by the atmospheric pressure sensor and the speed of the vehicle. More specifically, the slope of the road may be estimated using the vehicle speed and the speed in the gravity direction moving in the direction of gravity according to a change in the sensed atmospheric pressure.

In another embodiment, a slope of a road may be estimated by using acceleration or deceleration driving data of a vehicle.

Specifically, the slope of the road may be estimated using a driving force generated by a driving device of a vehicle or a braking force generated by a braking device, and acceleration or deceleration data including an acceleration or deceleration amount of the vehicle.

For example, an equation for estimating the slope of the road using the accelerator pedal depression amount (APS opening: Accelerator Position Sensor Opening), the brake depression amount, and the vehicle acceleration is pre-stored, and the processor 30 can estimate the slope of the road by applying acceleration or deceleration data to the pre-stored equation.

The processor 30 may estimate a slope by reflecting the actual acceleration detected by a wheel speed sensor to the acceleration information detected by an acceleration sensor.

In another embodiment, the slope of a road ahead of a vehicle may be estimated through an image of the vehicle in front of the vehicle captured by the camera using a camera sensor mounted to photograph the front of the vehicle.

In one embodiment, the processor 30 may calculate a compensation deceleration by reflecting the deceleration according to an estimated slope to a target deceleration, and determine as a braking strategy the speed profile over time based on the calculated compensation deceleration when the vehicle included in a platoon is braked.

The slope deceleration (a_θ) can be calculated by the following equation by reflecting the estimated slope (θ).

$$a\_\theta = g*\cos(\theta)\ [m/s^2]$$

In particular, the compensation deceleration (a_ctr) can be calculated by summing the slope deceleration (a_θ) to which the estimated slope (θ) is reflected and the target deceleration (a_req).

$$a\_ctr = a\_req + a\_e + \text{tolerance value}$$

Here, the tolerance value may be a value tuned for safety.

In another embodiment, the processor 30 may calculate a required braking time based on a calculated predicted time to collision (TTC), calculate a slope braking time according to an estimated slope, and determine a vehicle's braking strategy such that the calculated slop braking time is reflected at the calculated required braking time.

The determination unit may determine a braking timing based on a vehicle's braking strategy. The braking time may be determined as timing when the detector 20 detects that a collision with an obstacle is expected or the timing thereafter.

Specifically, the required braking time may be calculated based on the calculated predicted time to collision (TTC) or the profile of the calculated target deceleration (a_req) based on the calculated predicted TTC.

More specifically, the required braking time is included in the profile of the target deceleration (a_req), and for example, in the profile of the target deceleration (a_req), the required braking time can be set so that the maximum deceleration size is less than a preset value.

That is, according to one embodiment, in the processor 30, the profile of the target deceleration (a_req) can set the required braking time so that the maximum deceleration size becomes less than or equal to a preset value.

In addition, the processor 30 may calculate a slope braking time according to an estimated slope. In an exemplary embodiment, the slope braking time may be preset for each estimated gradient (θ), or may be calculated by the equation using the estimated gradient (θ) in another exemplary embodiment.

In one embodiment, the slope braking time is calculated as a positive value in case of a downhill slope, and a negative value in case of an uphill slope, and may be calculated so that the size of the slope braking time increases as the size of the slope increases.

Accordingly, the processor 30 may determine the braking strategy of the vehicle to reflect the slope braking time at the required braking time. Specifically, the processor 30 may determine that the braking strategy, in the case of downhill slope, is advanced by the slope braking time, rather than the required braking time, and the braking strategy, in the case of an uphill slope, is delayed by the slope braking time, rather than the required braking time.

The processor 30 may control the braking device of the vehicle included in a platoon according to the braking strategy determined by the processor 30 during braking.

The processor 30 may control the braking of the vehicle according to the braking strategy of the processor 30. In particular, the processor 30 may be connected to the brake device of the vehicle included in the platoon to control the brake device. The braking device may be a brake device for braking a vehicle wheel or an engine.

Figure 7:
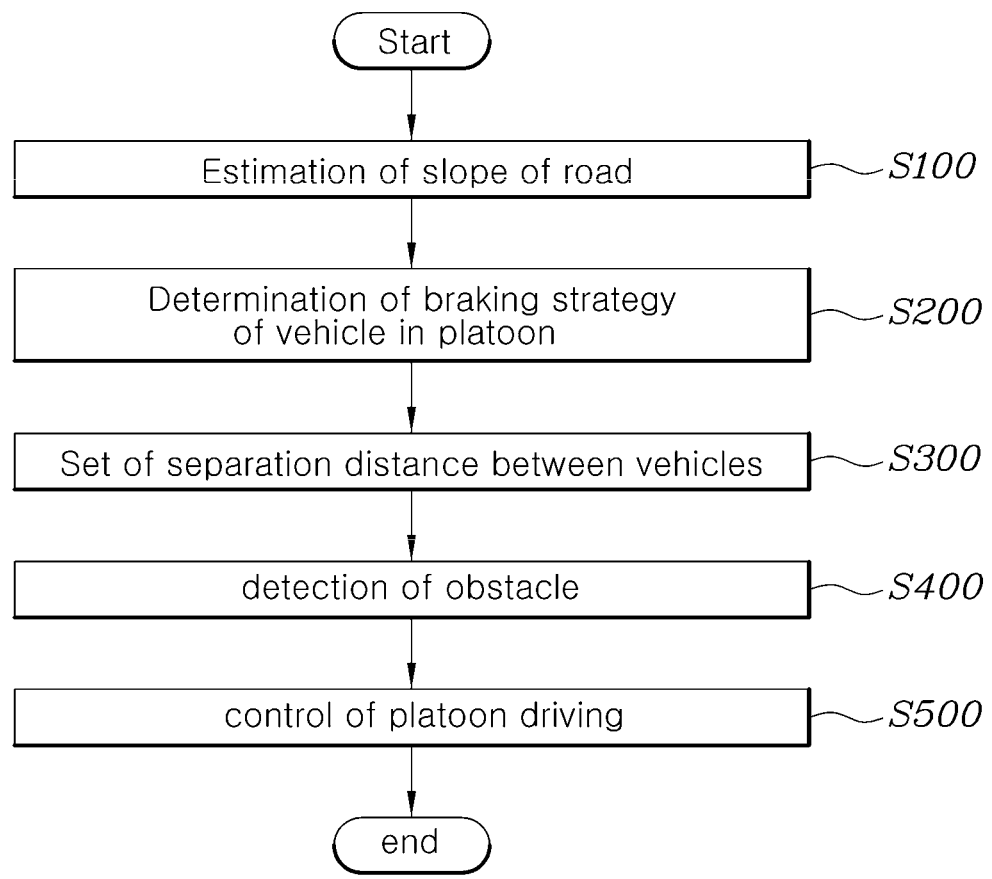
FIG. 7 is a flowchart of a method for controlling vehicle platoon driving according to an exemplary embodiment of the present disclosure.

FIG. 7 is a flowchart of a method for controlling platoon driving of a vehicle according to an exemplary embodiment of the present disclosure.

With further reference to FIG. 7, a method for controlling platoon driving of a vehicle according to an embodiment of the present disclosure includes a step of determining a braking strategy of a vehicle included in a platoon based on a driving speed of the platoon (S200); a step of detecting an obstacle positioned in a front according to a driving direction of the vehicle included in the platoon (S400); and the step of controlling the platoon driving based on the determined braking strategy and the detected obstacle (S500).

In the step of determining the braking strategy of the vehicle (S200), a speed profile over time during braking of the vehicle may be determined as the braking strategy based on a target deceleration.

In the step of determining the braking strategy of the vehicle (S200), a speed profile over time assuming that the obstacle is detected at a preset first speed or a speed profile over time when the vehicle brakes at a preset second speed can be determined as the braking strategy.

In the step of determining the braking strategy of the vehicle (S200), a speed profile of a following vehicle over time may be determined based on a speed profile of a preceding vehicle included in the platoon over time.

In the step of determining the braking strategy of the vehicle (S200), a speed profile of a following vehicle over time may be determined to be delayed by a preset time, rather than a speed profile of a preceding vehicle over time.

Prior to the step of controlling the platoon driving (S500), the step of setting a separation distance between the vehicles included in the platoon based on the determined braking strategy (S300) is further included. In the step of controlling the platoon driving, it is possible to control the platoon driving based on the set separation distance.

In the step of setting the separation distance (S300), the separation distance between a preceding vehicle and a following vehicle may be set based on a speed profile of the vehicle over time when the preceding vehicle and the following vehicle included in the platoon are braking.

Prior to the step of determining the braking strategy of the vehicle (S200), the step of estimating a slope of a road on which the platoon or the vehicle included in the platoon is driving (S100) is further included. In the step of determining the braking strategy of the vehicle, based on the estimated slope, the braking strategy of the vehicles included in the platoon can be determined.

In the step for determining the braking strategy of the vehicle (S200), a compensation deceleration is calculated by reflecting a deceleration according to the estimated slope to a target deceleration, and when the vehicle included in the platoon is braked, the speed profile overtime can be determined as the braking strategy based on the calculated compensation deceleration.

In the step of controlling the platoon driving (S500), a braking device of the vehicle included in the platoon may be controlled according to the braking strategy determined during braking.

Although shown and described in relation to specific embodiments of the present disclosure, it will be obvious to those of ordinary skilled in the art that the present disclosure can be variously improved and changed within the limit without departing from the technical spirit of the present disclosure provided by the following claims.

What is claimed is:

1. A platoon driving control system of a vehicle, comprising:
    a detector configured to detect an obstacle positioned in a front according to a driving direction of a vehicle included in a platoon;
    a processor; and
    a memory coupled to the processor and storing an algorithm that, when executed by the processor, causes the processor to:
        estimate a slope of a road on which the platoon or the vehicle included in the platoon is driving,
        calculate a slope braking time according to the estimated slope,
        calculate a required braking time based on a calculated predicted time to collision (TTC),
        determine a braking strategy such that the calculated slope braking time is reflected at the calculated required braking time,
        control a driving of the platoon based on the obstacle detected by the detector and the braking strategy,
        determine a speed profile of a following vehicle over time based on a speed profile of a preceding vehicle included in the platoon over time, and
        determine that controlling of the speed profile of the following vehicle over time is delayed by a preset time rather than the speed profile of the preceding vehicle over time,
    wherein the preset time is a constant value, or is set based on a separation distance between the preceding vehicle and the following vehicle and a vehicle speed.

2. The platoon driving control system of a vehicle according to claim 1, wherein the memory stores the algorithm that, when executed by the processor, further causes the processor to set the separation distance between the vehicles included in the platoon based on the determined braking strategy, and to control the platoon driving based on the set separation distance.

3. The platoon driving control system of a vehicle according to claim 2, wherein the memory stores the algorithm that, when executed by the processor, further causes the processor to set the separation distance between the preceding vehicle and the following vehicle based on the speed profile of the vehicle over time when the preceding vehicle and the following vehicle included in the platoon are braking.

4. The platoon driving control system of a vehicle according to claim 1, wherein the memory stores the algorithm that, when executed by the processor, further causes the processor to control a braking device of the vehicle included in the platoon according to the braking strategy determined during braking.

5. A method for controlling platoon driving of a vehicle comprising steps of:
    detecting an obstacle positioned in a front according to a driving direction of a vehicle included in a platoon;
    estimating a slope of a road on which the platoon or the vehicle included in the platoon is driving;
    calculating a slope braking time according to the estimated slope;
    calculating a required braking time based on a calculated predicted time to collision (TTC);
    determining a braking strategy such that the calculated slope braking time is reflected at the calculated required braking time;
    controlling platoon driving based on the determined braking strategy and the detected obstacle;
    determining a speed profile of a following vehicle over time based on a speed profile of a preceding vehicle included in the platoon over time; and
    determining that controlling of the speed profile of the following vehicle over time is delayed by a preset time rather than the speed profile of the preceding vehicle over time,
    wherein the preset time is a constant value, or is set based on a separation distance between the preceding vehicle and the following vehicle and a vehicle speed.

6. The method for controlling platoon driving of a vehicle according to claim 5, further comprising, prior to the step of controlling platoon driving, a step of setting the separation distance between the vehicles included in the platoon based on the determined braking strategy,
    wherein the step of controlling platoon driving, the platoon driving is controlled based on the set separation distance.

7. The method for controlling platoon driving of a vehicle according to claim 6, wherein, in the step of setting the separation distance, the separation distance between the preceding vehicle and the following vehicle is set based on the speed profile of the vehicle over time when the preceding vehicle and the following vehicle included in the platoon are braking.

8. The method for controlling platoon driving of a vehicle according to claim 5, wherein, in the step of controlling platoon driving, a braking device of the vehicle included in the platoon is controlled according to the braking strategy determined during braking.

* * * * *